United States Patent [19]

Cairns

[11] Patent Number: 5,533,826
[45] Date of Patent: Jul. 9, 1996

[54] CLAMPING ARRANGEMENT FOR SECURING GUIDE RAILS WITH RESPECT TO A CONVEYOR SYSTEM

[75] Inventor: James W. Cairns, West Chester, Pa.

[73] Assignee: Nolu Plastics, Inc., Aston, Pa.

[21] Appl. No.: 338,275

[22] Filed: Nov. 10, 1994

[51] Int. Cl.⁶ ..................................................... F16B 7/04
[52] U.S. Cl. ........................ 403/389; 403/385; 403/391; 403/373
[58] Field of Search .................................. 403/389, 383, 403/380, 373, 332, 180, 396, 391, 388, 385, 384, 24, 310, 186, DIG. 9, 405.1, 403, 211, 248, 206, 24; 211/182; 248/231.6; 198/836.2, 836.4; 24/335, 339, 569; 256/59, 65, 68, 69

[56] References Cited

U.S. PATENT DOCUMENTS

| | | | |
|---|---|---|---|
| 376,659 | 1/1888 | Kelly | 248/229 X |
| 1,631,831 | 6/1927 | Palmer-Jones . | |
| 1,950,635 | 6/1930 | Steinmayer . | |
| 2,733,035 | 1/1956 | Rocheleau . | |
| 2,942,899 | 6/1960 | Rifken . | |
| 3,025,089 | 3/1962 | Ramsden . | |
| 3,096,110 | 7/1963 | Cantor . | |
| 3,677,584 | 7/1972 | Short . | |
| 4,115,966 | 9/1978 | DeLee | 403/385 X |
| 4,275,872 | 6/1981 | Mullis | 403/385 X |
| 4,547,092 | 10/1985 | Vetter et al. | 430/389 X |
| 4,784,514 | 11/1988 | Pantev . | |
| 4,901,970 | 2/1990 | Moss et al. | 403/385 X |
| 5,078,537 | 1/1992 | Nomura | 403/405.1 X |
| 5,123,770 | 6/1992 | Trenner | 430/310 X |
| 5,184,911 | 9/1993 | Wu | 403/385 |
| 5,335,782 | 8/1994 | Herzog | 198/836.3 |

Primary Examiner—Kenneth J. Dorner
Assistant Examiner—Harry C. Kim
Attorney, Agent, or Firm—Cushman Darby & Cushman

[57] ABSTRACT

A clamping arrangement includes a support bracket and a clamping assembly. The clamping assembly includes a clamp sub-assembly having distal and proximal ends. The clamp sub-assembly includes first and second clamp components, each including a cut-out defined in a periphery thereof at an end surface thereof. The cut-outs cooperate to define a guide rail receiving channel for frictionally engaging and holding a guide rail therein. A threaded rod is disposed through the clamp sub-assembly. A control knob is coupled to one end of the rod. The clamping assembly further includes locking structure threadedly coupled to the other end of the rod. The support bracket is constructed and arranged to be mounted to a portion of the conveyor system and includes a receiving channel therein. The locking structure cooperates with the receiving channel so as to adjustably mount the clamping assembly laterally with respect to the support bracket. When tightening the control knob, the locking structure lockingly engages surfaces defining the receiving channel, and a distal end of the clamping assembly abuts a surface of the receiving portion so as to lock the clamping assembly to the support bracket.

14 Claims, 3 Drawing Sheets

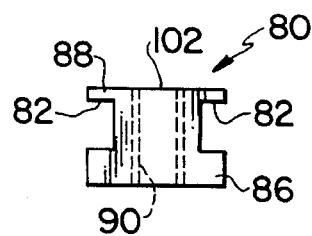
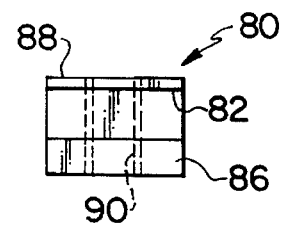
FIG. 5  FIG. 6
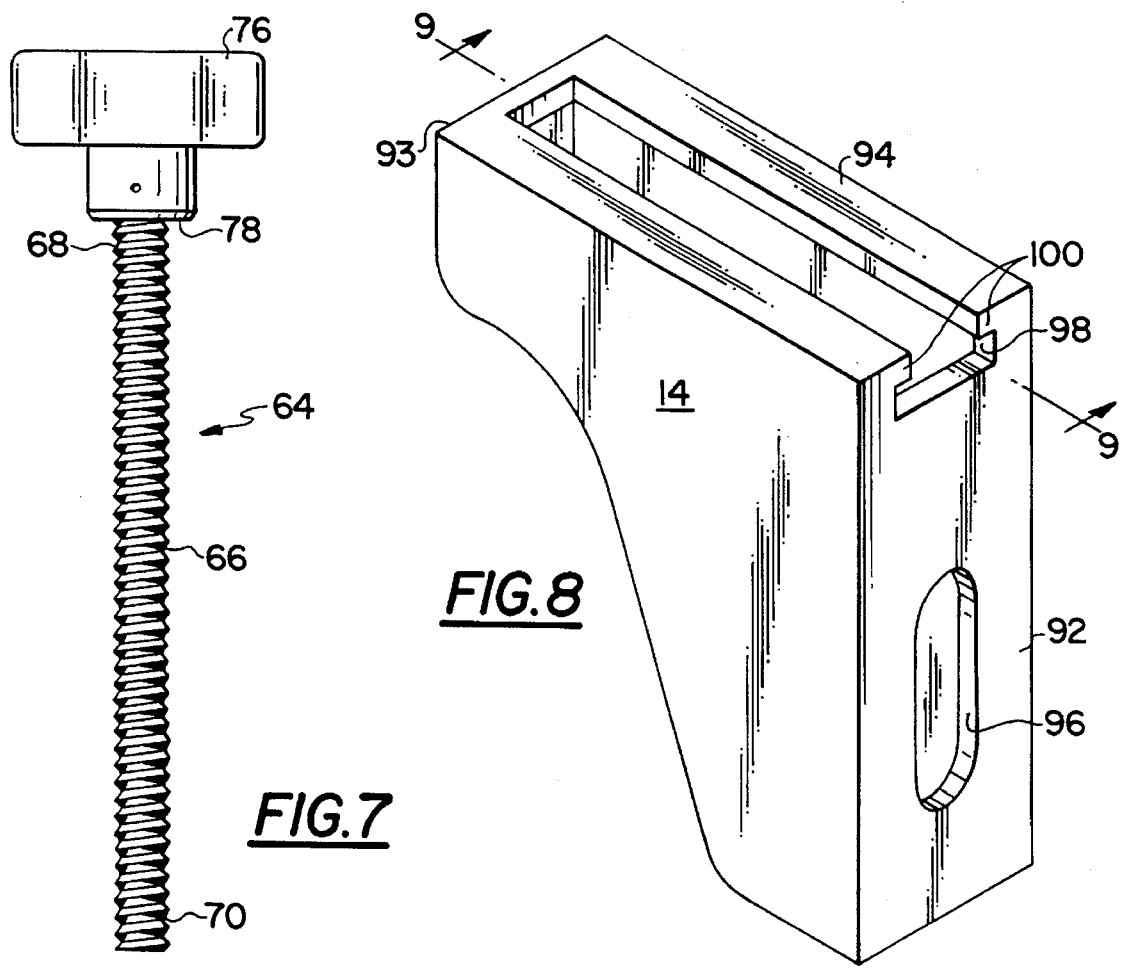
FIG. 7  FIG. 8

5,533,826

CLAMPING ARRANGEMENT FOR SECURING GUIDE RAILS WITH RESPECT TO A CONVEYOR SYSTEM

BACKGROUND OF THE INVENTION

This invention relates to a clamping arrangement and, more particularly, to a clamping arrangement for securing the guide rails of a conveyor system to support structure thereof.

Conveyor systems are commonly employed for transporting product containers during the filling, sealing and/or labelling process and typically include guide rails to guide and contain the product containers as they are transported by a moveable track. The guide rails are disposed on opposite sides of the track and may extend therealong for a significant distance. Thus, it is often necessary to secure the guide or side rails at various locations to the support structure of the conveyor system.

A variety of clamping assemblies are known to secure the side rails to the support structure of the conveyor system. One conventional assembly includes a bracket bolted to the conveyor support structure, a first pin extending vertically from the bracket, a clamping block frictionally engaged with the first pin and a second pin frictionally engaged with the clamping block and extending in a direction transverse to the first pin. A distal end of the second pin typically includes a clamp for receiving and holding one or more guide rails. The vertical position of the second pin and thus the guide rail, may be adjusted by moving the clamping block, together with the second pin, with respect to the first pin. The lateral position of the second pin and thus the guide rail, may be adjusted by moving the second pin with respect to the clamping block.

Although the conventional clamping assemblies generally work well for their intended purpose, Applicant has noted that many conventional clamping assemblies have complicated geometries resulting in structural irregularities, including cavities and notches formed in surfaces thereof. Further, in certain assemblies, threads or other mechanical components for tightening the clamping assembly may be exposed. As a result, dirt and debris can collect in the cavities, notches and/or in the exposed threads, making these clamping assemblies difficult to clean which in turn may create potential Food and Drug Administration (FDA) problems.

In addition, in certain arrangements, the pins, mounting bolts and the like may project from the clamping assembly, thereby increasing the risk of operator injury.

SUMMARY OF THE INVENTION

The inventor has recognized that in some production lines, it is contemplated that only one type of product or container is to be processed continuously. Thus, the inventor appreciated that in some production lines there is no need for adjustment of the guide rails after initial set-up. In connection with production lines of this type, the inventor herein has proposed to eliminate pins and other projecting components and the adjustments they facilitated in favor of a versatile, multi-component clamping assembly which minimizes the risk of injury to operators and presents a generally smoothly contoured configuration for ease of maintenance.

Thus, it is an object of the present invention to provide a clamping arrangement for securing side rails to support structure of a single product conveyor system which has a simple geometry, minimizing structural irregularities such as cavities, notches and exposed threads, whereby the collection of dirt and debris is minimized and the structure is easy to clean in order to avoid any potential FDA problems.

Another object of the present invention is to provide a clamping arrangement having generally smooth and continuous peripheral surface which substantially eliminates projecting parts to minimize the likelihood of operator injury from such projecting components.

In accordance with the principles of the present invention, these objectives are obtained by providing a clamping arrangement including a support bracket and a clamping assembly. The clamping assembly includes a series of stacked components each having distal and proximal ends. Two adjacent components define a clamp subassembly including cooperating cut-outs which define, when stacked, a guide rail receiving channel for frictionally engaging and holding a guide rail therein when the clamping assembly is in a clamping position. A plurality of clamp sub-assemblies may be stacked to accommodate a variety of guide rail combinations.

The support bracket includes a mounting portion constructed and arranged to be mounted on the support structure of the conveyor system and a receiving portion constructed and arranged to extend generally transversely from the mounting portion. The receiving portion includes a receiving channel. Locking structure of the clamping assembly cooperates with the receiving channel so as to adjustably mount the clamping assembly laterally with respect to the support bracket.

The clamping assembly is generally cylindrical defining a smoothly contoured, generally continuous peripheral surface thereby minimizing surfaces where dirt and debris may collect.

Other objects, features and characteristics of the present invention, as well as the function of related elements of the structure, in combination of the parts and economies of manufacture, will become more apparent upon consideration of the following detailed descriptions and appended claims with reference to the accompanying drawings, all of which form a part of this specification.

BRIEF DESCRIPTION OF THE DRAWINGS

FIG. 5 is a side elevational view of locking structure provided in accordance with the principles off-the present invention;

FIG. 6 is a front elevational view of the locking structure of FIG. 5;

FIG. 7 is a view of a control knob assembly provided in accordance with the invention;

FIG. 8 is a perspective view of a support bracket of the clamping arrangement, provided in accordance with the principles of the present invention.

DETAILED DESCRIPTION OF THE PRESENTLY PREFERRED EXEMPLARY EMBODIMENTS

Figures 1, 2, 3, 4:
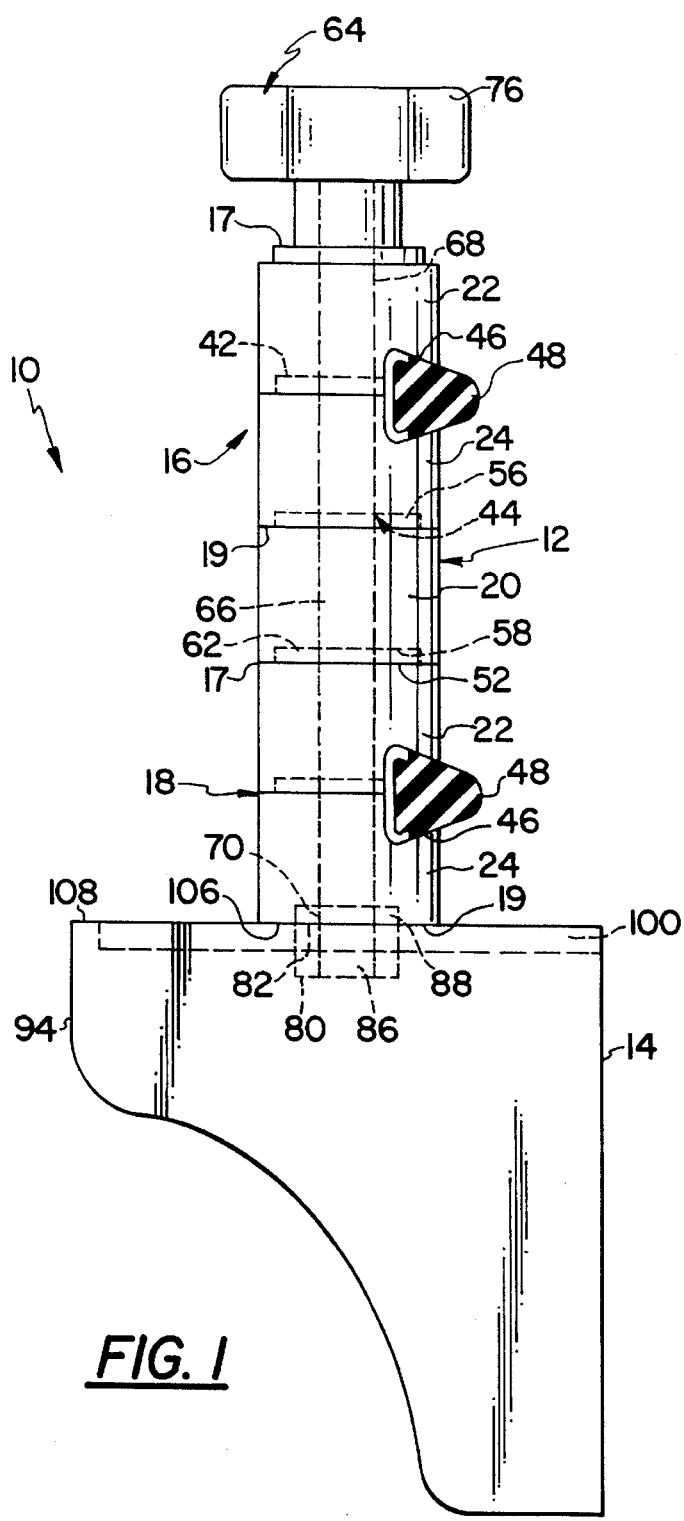
FIG. 1 is side elevational view of a clamping arrangement including a clamping assembly and a support bracket, provided in accordance with the principles of the present invention.
FIG. 2 is a cross-sectional view of a first clamp component of the clamp sub-assembly of the clamping assembly, provided in accordance with the present invention.
FIG. 3 is a sectional view of a second clamp component of the clamp sub-assembly of the clamping assembly, provided in accordance with the present invention.
FIG. 4 is a sectional view of a spacer of the clamping assembly provided in accordance with the principles of the first embodiment of the present invention.
Figure 9:
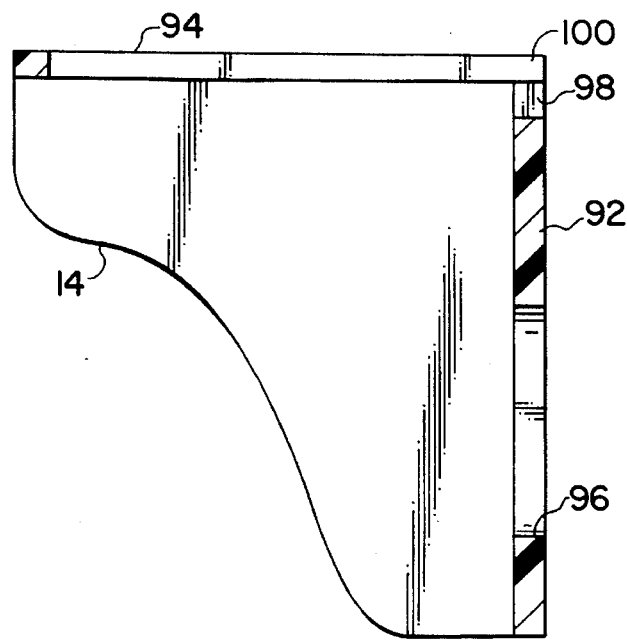
FIG. 9 is a sectional view taken along line 9—9 of FIG. 8

Referring to the drawings, a clamping arrangement, generally indicated at 10, for adjustably securing guide or side rails of a conveyor system (not shown) to support structure thereof, is shown. The clamping arrangement 10 includes a clamping assembly, generally indicated at 12 and a support bracket, generally indicated at 14.

As shown in FIG. 1, the clamping assembly 10 comprises stacked clamp sub-assemblies 16 and 18, respectively, and a spacer 20 between the sub-assemblies. With reference to FIGS. 2 and 3, each clamp sub-assembly 16 and 18 has a proximal end 17 and a distal end 19 and includes a first clamp component 22 (FIG. 2) and a second clamp component 24 (FIG. 3).

Each first clamp component 22 is of generally cylindrical configuration having proximal and distal end surfaces 26 and 28, respectively, and a bore 30 extending axially between the end surfaces 26 and 28. A cut-out 32 is defined in the periphery of the first clamp component 22 at the distal end surface 28 thereof. The distal end surface 28 includes a recess 33 therein and the proximal end surface includes a step 35, the function of which will become apparent below.

The second clamp component 24 is also of generally cylindrical configuration having a diameter generally equal to that of the first clamp component 22. The second clamp component 24 includes proximal and distal end surfaces 34 and 36, respectively, and a bore 38, of a diameter generally equal to that of bore 30, extending axially between the end surfaces 34 and 36. A cut-out 40 is defined in the periphery of the second clamp component 24 at the proximal end surface 34 thereof. The proximal end surface 34 includes a step 42 and the distal end surface 36 includes a recess 44 therein, such that step 42 may cooperate with recess 33 of the first clamp component 22 upon assembly.

With reference with FIG. 1, when assembled, cut-out 32 cooperates with cut-out 40 to define a guide or side rail receiving channel 46 in each of the clamp sub-assemblies, 16 and 18 for frictionally engaging and holding a side rail 48 therein. In the illustrated embodiment, the channels 46 are of generally triangular configuration to accommodate side rails having a generally triangular cross-section. However, it is contemplated that the channels 46 may be of any configuration corresponding to a particular shape of the side rails 48, for example, round, conic, square, etc.

As shown in FIG. 4, the clamping assembly 12 includes a generally cylindrical spacer 20 having a diameter generally equal to the diameters of the clamp components 22 and 24. The spacer 20 includes proximal and distal end surfaces 50 and 52, respectively, and a bore 54, of a diameter generally equal to that of bore 30, extending axially between the end surfaces 50 and 52. The proximal end surface 50 includes a step 56 and the distal end surface 52 includes a recess 58 therein. The step 56 may cooperate with recess 44 of the second clamp component 24 upon assembly.

The clamping assembly 12 includes a control knob assembly, generally indicated at 64. The control knob assembly 64 includes a rod 66 disposed through the aligned bores 30, 38 and 54 of the first clamp component 22, the second clamp component 24 and spacer 20. In the illustrated embodiment, the rod 66 is threaded along its entire length. The rod 66 has first and second ends, 68 and 70, with end 68 extending beyond the proximal end 17 of clamp sub-assembly 16 and end 70 extending beyond distal end 19 of clamp sub-assembly 18 of the clamping assembly 12 (FIG. 1). A control knob 76 is coupled to the first end 68 of the rod 66. The control knob 76 has a seating surface 78 constructed and arranged to contact the proximal end 17 of the clamp sub-assembly 16, as shown in FIG. 1.

The clamping assembly 12 further includes locking structure, generally indicated at 80, which, in an operative position is in threaded engagement with the second end 70 of the rod 66. The locking structure 80 comprises a generally rectangular member having parallel notches 82 formed in opposite side faces thereof, defining spaced flanges 86 and 88. In the illustrated embodiment, the locking structure 80 is coupled to the rod 66 via threaded bore 90. However, it is within the contemplation of the invention to provide a threaded metal insert in the bore 90 to define threads for engaging the threads of the rod 66.

As noted above, the clamping arrangement 10 includes a support bracket 14. The support bracket 14 includes a mounting portion 92 constructed and arranged to be mounted to a portion of conveyor system and a clamping assembly receiving portion 94 constructed and arranged to extend generally transversely from the mounting portion 92. The support bracket 14 is preferably molded from plastic material, however, it can be appreciated that the support bracket could machined.

With reference to FIG. 8, the mounting portion 92 includes a hollow region 96 therein defining a fastener receiving portion for receiving bolting or the like to couple the mounting portion 92 to the conveyor system. The receiving portion 94 includes a receiving channel 98 therein defined by protrusions 100 such that flange 86 of the locking structure 80 may be disposed in the receiving channel 98 with the protrusions 100 extending into the notches 82 of the locking structure 80, as best shown in FIG. 1. As shown in FIG. 8, the receiving channel 98 does not extend to end 93 of the support bracket 14. However, if it is desired to insert or remove the clamping assembly 12 from either end of the support bracket 14, the receiving channel 98 would extend to end 93.

The locking structure 80 is sized so that a surface 102 thereof may be received in any of the recesses 33, 44 and 58 of the clamping assembly 12.

With reference to FIG. 1, it can be appreciated that a variety of combinations of the clamp sub-assemblies 16 and 18, and spacer(s) 20 are available to increase or decrease the height of the clamping assembly 12, or to adjust the distance between the channels 46 for receiving the side rails 48. For example, FIG. 1 shows step 56 of spacer 20 engaging recess 44 of the second clamp component 24 and the step 62 of the clamp sub-assembly 18 engaging recess 58 of the spacer 20 to accommodate mounting two parallel side rails 48. If only one side rail 48 is to be secured to the conveyor system, then the clamp sub-assembly 18 may be omitted and the spacer 20 may be coupled directly to the support bracket 14 via the locking structure 80. In this position, distal end 52 of the spacer 20 defines the distal end of the clamping assembly 12.

If the spacer 20 is not required, the clamp sub-assembly 16 may be mounted directly to the support bracket 14 via the locking structure 80. In this position, distal end 19 of clamp sub-assembly 16 defines the distal end of the clamping assembly 12.

Further, if the spacing between the rails 48 is such that it is necessary for the clamp sub-assemblies 16 and 18 to be stacked upon each other, the spacer 20 may be disposed below the clamp sub-assembly 18 and coupled directly to the support bracket 14 via the locking structure 80, so as to decrease the distance between the channels 46 receiving the side rails 48.

With reference to FIG. 1, the operation of the clamping arrangement 10 will be appreciated. As noted above, the clamping assembly 12 includes two clamp sub-assemblies 16 and 18, and one spacer 20. However, it could be appreciated that a plurality of clamp sub-assemblies and a plurality of spacers may be provided in a kit to accommodate different side rail mounting arrangements.

The clamping arrangement 10 is preferably used with single product conveyor system. Thus, once the clamping arrangement 10 is in place, it is not intended to be adjusted to accommodate a new product or container.

To assemble the clamping arrangement 10 to secure the side rails 48 of the conveyor system, the support bracket 14 is first coupled to the conveyor system at the mounting portion 92 thereof. The control knob 76 of the clamping assembly 12 is rotated so as to reduce the threaded engagement of the rod 66 with the locking structure 80. Upon loosening the assembly 12, the individual clamp components 22 and 24 may be spread in the axially direction such that the channels 46 are enlarged so as to receive an associated side rail 48. Once the side rails 48 are coupled to the channels 46, the locking structure 80 is slid into the channel 98 of the support bracket 14 such that the protrusions 100 of the receiving portion 94 extend into the notches 82 of the locking structure 80. Thus, the clamping assembly 12 is movable laterally with respect to the support bracket 14, which is fixed to the conveyor system. Once the proper orientation is established, the control knob 76 is rotated so as to further engage the rod 66 with the threads of the locking structure 80. When the seating surface 78 of the control knob 76 abuts the proximal end 17 of the first clamp portion 16, the flange 86 of the locking structure 80 lockingly engages protrusions 100, and a distal end 106 of the clamping assembly 12 abuts a surface 108 of the support bracket 14 thereby locking the clamping assembly 12 to the support bracket 14 such that relative rotational movement between each clamp component 22, and 24 of each clamp sub-assembly 16 and 18, and the spacer 20 is prevented.

Figure 10:
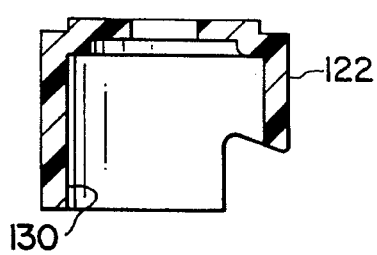
FIG. 10 is a sectional view of a molded first clamp component provided in accordance with the invention.
Figure 11:
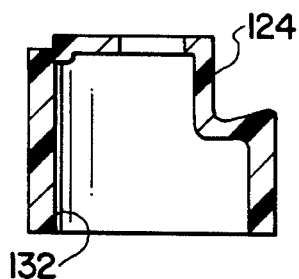
FIG 11 is a sectional view of a molded second clamp component provided in accordance with the invention.
Figure 12:
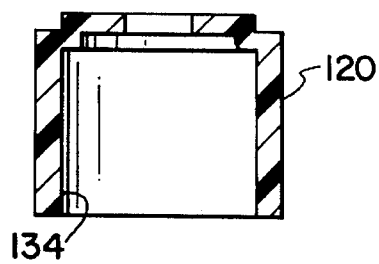
FIG. 12 is a sectional view of a molded spacer provided in accordance with the invention.

The clamp sub-assemblies 16 and 18, and the spacer 20 may be machined or molded. Machined part may be made from polyester, polyvinyl chloride (PVC) or the like. However, it is preferable to mold these parts from Acetal, reinforced nylon or other suitable moldable materials, to reduce manufacturing cost. Thus, with reference to FIGS. 10-12, molded first and second clamp components and spacer of the clamping assembly are shown. The first clamp component 122 includes an internal cavity 130, the second clamp component 124 includes an internal cavity 132 and the spacer 120 includes an internal cavity 134. These cavities are provided to ensure proper molding, without shrinkage. In all other aspects, clamp components 122, 124 and spacer 120 are generally similar to parts 22, 24 and 20, respectively, of the structure illustrated in FIGS. 2-4.

It can be appreciated that the clamping arrangement including the clamp components is readily adaptable to clamp side rails to a conveyor system to accommodate a variety of product containers to be processed.

In the illustrated embodiment, since the diameter of each of the clamp components 22 and 24 and spacer 20 are generally equal, the assembled clamping assembly 12 provides a smoothly contoured, generally continuous outer peripheral surface, and none of the threads of the rod 66 are exposed directly to the environment. It can be appreciated, however, that the diameters of the clamp components need not be equal in order to provide a smoothly contoured clamping assembly.

Thus, the clamping arrangement 10 is constructed and arranged to ensure minimal dirt will accumulate thereon, to avoid any potential FDA problem. Further, there are no sharp edges or protrusions which may injure and operator of the conveyor system.

Thus, the objects of this invention have been fully and effectively accomplished. It will be realized, however, that the foregoing preferred embodiments have been shown and described for the purposes of illustrating the structural and functional principles of the present invention and subject to change without departure from such principles. Therefore, this invention includes all modifications encompassed within the spirit of the following claims.

What is claimed is:

1. A clamping arrangement for adjustably securing guide rails of a conveyor system to support structure thereof, said clamping arrangement comprising:

a support bracket, and a clamping assembly comprising:

at least one clamp sub-assembly having distal and proximal ends, each clamp sub-assembly including first and second clamp components, each of said clamp components having a proximal end, a distal end and a bore defined between said ends thereof, said distal end of said first clamp component facing said proximal end of said second clamp component, said bores being axially aligned, said first clamp component including a cut-out defined in a circumferential wall thereof at the distal end thereof, said second clamp component including a cut-out defined in a circumferential wall thereof at said proximal end thereof, said cut-outs cooperating to define a guide rail receiving channel for frictionally engaging and holding a guide rail therein, a rod having at least a portion of a length thereof defining screw threads, said rod being disposed through said aligned bores and having first and second ends extending beyond said proximal and distal ends of said at least one clamp sub-assembly, respectively, a control knob coupled to said first end of said rod and having a seating surface constructed and arranged to operatively engage said proximal end of said at least one clamp sub-assembly, and locking structure threadedly coupled to said second end of said rod, said support bracket including a mounting portion constructed and arranged to be mounted on a portion of the conveyor system and a receiving portion constructed and arranged to extend generally transversely from said mounting portion, said receiving portion including a receiving channel, said locking structure cooperating with said receiving channel so as to adjustably mount said clamping assembly with respect to said support bracket, whereby, when tightening said control knob so that said seating surface operatively abuts said proximal end of said at least one clamp sub-assembly, said locking structure lockingly engages surfaces defining said receiving channel, and said distal end of said at least one clamp sub-assembly operatively abuts a surface of said receiving portion so as to lock said clamping assembly to said support bracket.

2. The clamping arrangement according to claim 1, wherein said first and second clamp components are each generally cylindrical and have generally equal diameters such that said at least one clamp sub-assembly has a smoothly contoured, generally continuous peripheral surface, said first clamp component having a recess defined in said distal end surface thereof and a step at said proximal end surface thereof, said second clamp component having a step at said proximal end surface thereof and a recess in said distal end thereof, said step of said second clamp component engaging said recess of said first clamp component when the first and second clamp components are coupled to define said clamp sub-assembly, and wherein said rod is constructed and arranged with respect to said support bracket and said clamping assembly such that the screw threads thereof are not directly exposed to the environment.

3. The clamping arrangement according to claim 2, wherein said clamping assembly further comprises a generally cylindrical spacer having a diameter generally equal to the diameters of said first and second clamp components, said spacer having distal and proximal ends and a bore between said distal and proximal ends, said proximal end including a step for selective engagement with said recess of said second clamp component such that said bore of said spacer aligns with the bores of said first and second clamp components thereby increasing an overall length of said clamping assembly, said rod extending through said clamping assembly with said locking structure being threadedly engaged with said rod adjacent said distal end of said spacer.

4. The clamping arrangement according to claim 3, wherein first and second clamp sub-assemblies are provided, a proximal end of said second clamp sub-assembly having a step engaging the recess of one of said second clamp component and said spacer.

5. The clamping arrangement according to claim 3, wherein said first and second clamp components and said spacer are molded from Acetal.

6. The clamping arrangement according to claim 3, wherein said first and second clamp components and said spacer are molded from reinforced nylon.

7. The clamping arrangement according to claim 3, wherein said first and second clamp components and said spacer are made from polyester.

8. The clamping arrangement according to claim 3, wherein said first and second clamp components and said spacer are made from polyvinyl-chloride.

9. The clamping arrangement according to claim 1, wherein said locking structure comprises a generally rectangular member having parallel notches formed in opposite side faces thereof, said notches defining spaced flanges, and wherein said receiving portion includes protrusions extending into said receiving channel, one of said flanges being disposed in said receiving channel with said protrusions extending into said notches.

10. The clamping arrangement according to claim 1, wherein said guide rail receiving channel is constructed and arranged to receive said guide rail having a generally triangular cross-section.

11. The clamping arrangement according to claim 1, wherein said mounting portion of said support bracket includes a hollow region defining a fastener receiving portion for coupling the support bracket to the support structure of the conveyor system.

12. The clamping arrangement according to claim 3, wherein said distal end of said spacer defines said distal end of said clamp sub-assembly.

13. The clamping arrangement according to claim 4, wherein the proximal end of the second clamp sub-assembly engages the recess of the spacer, wherein said rod extends through said first and second clamp sub-assemblies with said locking structure being threadedly engaged with said rod adjacent the distal end of said second clamp sub-assembly, said distal end of said second clamp sub-assembly being disposed at a distal end of said clamping assembly whereby clamping of two guide rails is provided.

14. The clamping arrangement according to claim 2, wherein first and second clamp sub-assemblies are provided, a proximal end of said second clamp sub-assembly having a step complimentary to the recess of the second clamp component of the first clamp sub-assembly.

* * * * *

UNITED STATES PATENT AND TRADEMARK OFFICE
CERTIFICATE OF CORRECTION

PATENT NO.   : 5,533,826
DATED        : July 9, 1996
INVENTOR(S)  : CAIRNS

It is certified that error appears in the above-identified patent and that said Letters Patent is hereby corrected as shown below:

On the Title Page, item

"[21]   Appl. No.: 338,275"   should be

--[21]   Appl. No.: 339,275--

Signed and Sealed this

Twenty-fourth Day of September, 1996

Attest:

BRUCE LEHMAN

Attesting Officer    Commissioner of Patents and Trademarks